Figure 1:
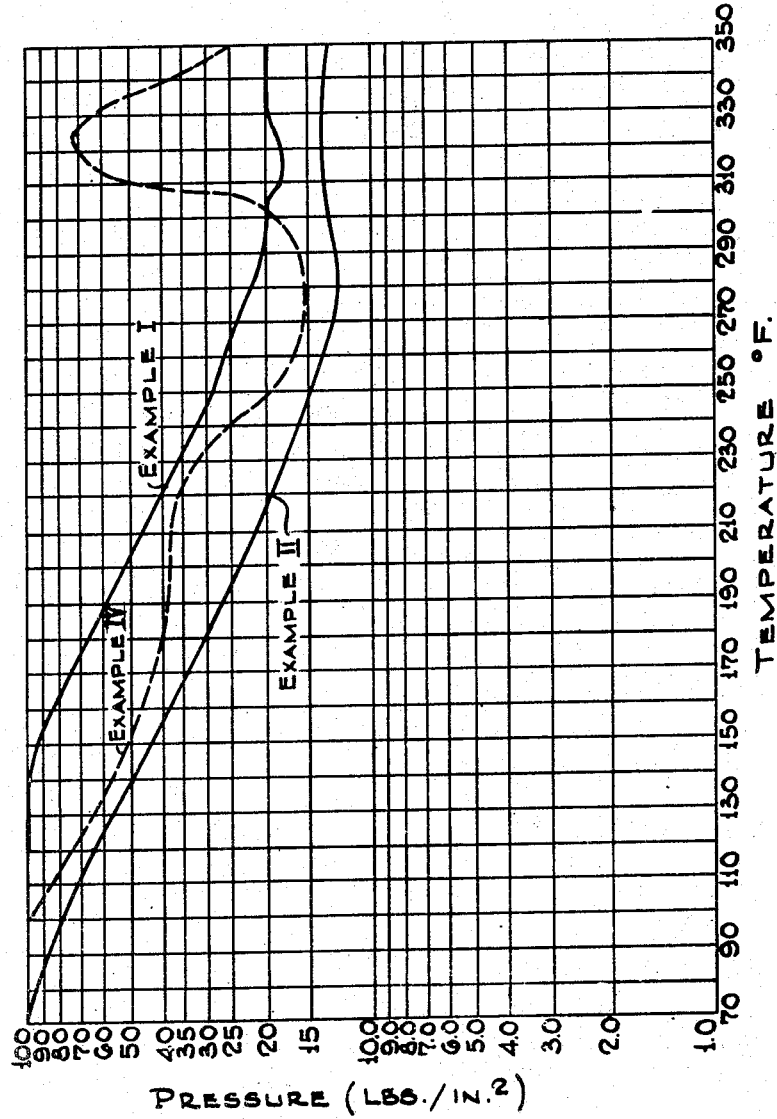

Patented Apr. 26, 1949

2,468,099

UNITED STATES PATENT OFFICE 2,468,099

HIGH-TEMPERATURE GREASE

Arnold J. Morway, Clark, N. J., assignor to Standard Oil Development Company, a corporation of Delaware Application October 1, 1947, Serial No. 777,328

11 Claims. (Cl. 252—42)

The present invention relates to a high temperature grease and method of preparing the same. More particularly, it relates to a grease of improved structure and stability. It relates further to a grease containing a normally water soluble soap which is treated in a manner that improves its resistance to oil separation and to oxidation and tends to insolubilize said soap in water and thereby tends to reduce leaching of the soap from the grease with consequent deterioration of the lubricant.

In the prior art, numerous lubricating grease compositions have been proposed having various characteristics such as high temperature consistency, resistance to leaking or oil separation, resistance to oxidation, waterproof properties, and the like. As a general rule, such compositions have been prepared by incorporating into a suitable lubricating oil, usually of mineral oil base, a metallic soap of fatty oils or fatty acids which has the property of thickening the lubricating oil to a grease-like consistency. In many applications of lubricating compositions, the conditions of use are such that liquid compositions are unsatisfactory because they run out of bearings or other parts to be lubricated unless a suitable oil sump is provided, or they are readily washed away or otherwise rendered ineffective. Moreover, they do not furnish a good seal against dirt and dust. For such purposes, lubricating greases have an important field of use, it being particularly important that during all types of use they retain a given required consistency so as to remain in place and perform their lubricating and sealing functions. A particular application of lubricating greases, for example, is their use in ball and roller bearings. In many instances, antifriction bearings run at fairly high temperatures and due either to the high temperatures or to the churning action of the bearings, many types of greases become too soft or fluid at elevated temperatures to remain in situ and properly perform their lubricating functions. For such purposes, high temperature greases of stable structure are usually required, that is greases which do not melt or separate oil from the thickener at temperatures over 350° to 400° F., for example. At the same time the greases must be capable of giving adequate lubrication at much lower temperatures. Obviously they must not be too hard or stiff to give proper protection at ordinary temperatures even though their principal use is for high temperature operation.

It has been customary in the past to raise the melting point of certain greases, for example sodium soap greases, by increasing the percentage of soap employed in the lubricant. This may be satisfactory for some purposes but frequently is objectionable for the reason just suggested that such greases are too stiff for satisfactory lubrication at normal starting temperatures, requiring excessive torque and resulting in unsatisfactory performance where operation may proceed for appreciable periods of time at low or even normal temperatures.

Many of the purposes for which high temperature lubricants are required involve other adverse operating conditions. For example, in many cases there is a marked tendency to oxidation and some tendency to deteriorate because of moisture in a humid atmosphere or water may be present in liquid form which tends to leach out the soap from the oil allowing the lubricant to leak away from the bearing and leave the bearing unprotected.

It is, therefore, an object of the present invention to improve the high temperature stability, oxidation stability, and to some extent to improve the moisture-resisting properties of lubricating greases, particularly lubricating greases of the sodium soap or other alkali metal soap type. It is a further object of this invention to secure such improvements by the use of simple and inexpensive materials and process steps. Other and further objects will appear as this description proceeds.

Normal ball bearing greases and other so-called high temperature lubricants, which are usually prepared from sodium soaps and from mineral lubricating oils having a viscosity which may vary from about 90 or 100 to 1000 S. S. U. at 100° F., usually melt at a temperature in the neighborhood of 350° F. to 400° F. Even higher melting points may be obtained by using cylinder oils and bright stocks of high viscosity or, as indicated above, by increasing the soap content. Both of these methods, however, produce greases which require excessive starting torques at low or even at normal temperatures and result in unsatisfactory lubrication at the lower temperatures of operation. It has been found that the addition of small quantities of unsaturated low molecular weight mono-basic acids to the fatty acids or fats employed in the soaps used in lubricating grease manufacture results in very marked improvement as regards the melting point, physical structure stability, oxidation resistance, and other important properties. A particularly suitable low molecular weight acid is acrylic acid, as will be evident from the following examples.

Four greases were prepared using the same procedure. Three of the greases contained acrylic acid, and the fourth, for comparison, contained no low molecular weight unsaturated acid. In each case fatty acids and about one-third of the mineral oil were first charged to a fire-heated kettle and the temperature was raised to 150° F. and held there until all the solid fatty materials had melted. When the unsaturated acid, specifically acrylic acid, was used, it was added and immediately thereafter the alkali, sodium hydroxide, was added as a 30% aqueous solution.

The temperature was next raised to about 220° F. while agitating until the soaps were substantially dehydrated. The remainder of the mineral oil was then added to the kettle in small quantities progressively while the temperature was raised to about 300° F. Thereafter the temperature of the grease was raised further to about 500° F. and the heating was then discontinued. During these heating operations, stirring was continuous.

While the composition was permitted to cool down to about 200° F., stirring was continued. At this temperature the grease was withdrawn from the kettle, filtered and packaged.

The formulas which were employed are shown below.

EXAMPLE I

| | Per cent |
|---|---|
| Oleic acid | 10 |
| Hydrogenated fish oil acids | 10 |
| Sodium hydroxide | 5.4 |
| Acrylic acid (CH$_2$=CHCOOH) | 2.0 |
| Mineral lubricating oil (500 S. S. U. viscosity at 100° F. from low cold test crude) | 72.6 |

EXAMPLE II

| | Per cent |
|---|---|
| Hydrogenated fish oil acids | 15 |
| NaOH | 4.2 |
| Acrylic acid | 2.0 |
| Phenyl alpha naphthylamine | 1.0 |
| Mineral lubricating oil (500 S. S. U. viscosity at 100° F. from low cold test crude) | 77.8 |

EXAMPLE III

| | Per cent |
|---|---|
| Oleic acid | 15 |
| NaOH | 4.0 |
| Acrylic acid | 2.0 |
| Phenyl alpha naphthylamine | 1.0 |
| Mineral lubricating oil (500 S. S. U. viscosity at 100° F. from low cold test crude) | 78.0 |

For purposes of comparison with the greases of Examples I, II, and III, another grease was prepared, omitting the unsaturated low molecular weight acid but increasing the soap content in order to obtain a grease of comparable consistency.

EXAMPLE IV

| | Per cent |
|---|---|
| 60% hydrogenated fish oil acid, 40% oleic acid | 25.00 |
| Glycerine | 2.50 |
| 50/50 sodium sulfonates and oil | 1.00 |
| Phenyl alpha naphthylamine | 1.00 |
| Sodium hydroxide | 4.50 |
| Mineral lubricating oil (500 S. S. U. viscosity at 100° F. from low cold test crude) | 66.00 |

Comparative physical properties of these four examples are given in Table I.

TABLE I

*Properties of acrylic acid greases*

| | Example | | | |
|---|---|---|---|---|
| | I | II | III | IV (no acrylic acid present) |
| Dropping Point, °F | 450 | 438 | 438 | 360 |
| Penetration unworked (after filtering) | 234 | 188 | | 240 |
| Penetration worked (60X) | 222 | 201 | | 285 |
| Penetration (100,000 strokes—Fine hole worker plate) | 350 | 220 | | |
| Per cent oil separation (250° F. for 50 hours—60 mesh cone method) | 3.2 | | | |

The superior properties of the greases of Examples I, II, and III which contained acrylic acid will be evident from the data in Table I. In particular, it will be noted that the addition of acrylic acid to the greases raises their dropping points considerably. The acrylic acid greases had lower penetrations both before and after working, showing their improved consistency and resistance to shear breakdown. The grease of Example I showed satisfactory low oil separation characteristics, only 3.2% separation occurring after 50 hours at 250° F. Figure I is a graph showing the effect of changes in temperature on the pressure viscosity of greases prepared with and without acrylic acid. As shown in this figure, the acrylic acid-containing greases possess excellent high temperature consistency properties, not becoming viscous and rubbery as does the usual commercial high temperature grease above about 300° F. Moreover, they do not become excessively fluid at high temperatures as is the case with other types of greases.

The superior properties of greases prepared according to the invention described herein containing small amounts of low molecular weight unsaturated aliphatic acids are also shown by Examples V, VI, VII, and VIII listed in Table II. The data given in this table show that these greases are more resistant to oxidation and oil separation if the finished greases are slightly alkaline rather than acidic in reaction.

TABLE II

Properties of acrylic acid greases

| Designation | Example | | | | |
|---|---|---|---|---|---|
| | V | VI | VII | VIII (no acrylic acid present) | Premium Grade Commercial Grease (no acrylic acid present) |
| Formulation: | | | | | |
| Acrylic acid_____per cent__ | 2.0 | 2.0 | 2.0 | | |
| Hydrogenated fish oil acids_____do__ | 8.0 | 8.0 | 8.0 | 10.0 | |
| Oleic acid_____do__ | 2.0 | 2.0 | 2.0 | 2.0 | |
| Sodium hydroxide_____do__ | 2.8 | 2.5 | 2.3 | 2.0 | |
| Phenyl alpha naphthylamine_____do__ | 0.5 | 0.5 | 0.5 | 0.5 | |
| Mineral lubricating oil (500 S. S. U. Viscosity at 100° F. from low cold test crude)_____per cent__ | 84.7 | 85.0 | 85.2 | 85.5 | |
| Free alkalinity or acidity_____do__ | ¹0.30 | ¹0.08 | ²0.45 | ¹0.26 | ¹0.30-0.60 |
| Penetration, mm./10: | | | | | |
| Appearance | smooth | smooth | smooth | grainy | smooth |
| Unworked | 209 | 170 | 226 | 197 | 185-215 |
| 60 Strokes | 205 | 194 | 260 | 208 | 230 Max. |
| 100,000 Strokes (Five hole worker plate) | 192 | 320 | 250 | | 250 |
| Oil Separation: | | | | | |
| Storage | none | trace | trace | | trace-none |
| 50 Hours at 210° F_____per cent__ | 4.2 | 4.5 | 15.5 | | 2.5 |
| Ford Wheel Test, 6 Hours at 220° F_____do__ | none | none | 25 | | none |
| ASTM dropping point, °F | 450 | 388 | 400 | 364 | 450-500 |
| Norma-Hoffman Bomb Oxidation Test (Hours to 5 p. s. i. drop) | 190 | 296 | 36 | | 110-170 |
| High Temperature/Pressure Vis. Pressure at 350° F._____pounds__ | 7.5 | 6.0 | 2.5 | | 26 |
| Navy Water Washing Test, per cent grease loss at— | | | | | |
| 75° F | 5 | 7 | 0 | | 100 |
| 100° F | 10 | 20 | 5 | | |

¹ As NaOH.
² As oleic acid.

The data in Table II also demonstrate the improvement in water resistance obtained by the addition of acrylic acid to the grease formulation.

Figure 2:
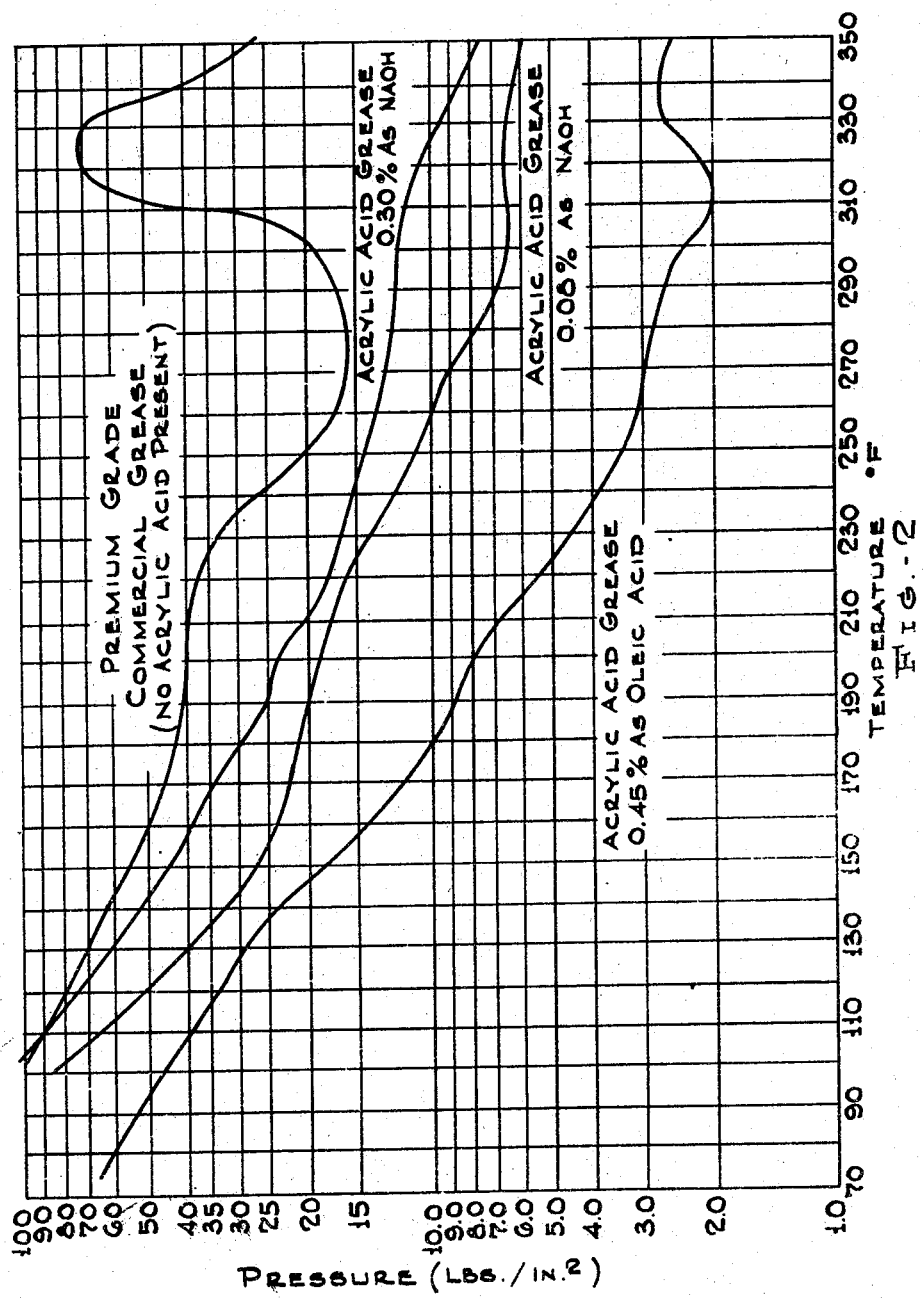

Figure 2 is a graph showing the effect of changes in temperature on the pressure viscosity of alkaline and acid acrylic acid greases in comparison with a premium-grade commercial grease. As can be seen from this figure, neither type of acrylic acid grease exhibits the abrupt change to a viscous, rubbery material shown by the commercial high temperature grease. The alkaline grease, however, is even more desirable than the acidic one, showing less tendency to become excessively fluid with an increase in temperature.

In the examples given above, hydrogenated fish oil acids and oleic acids were used to prepare the soaps and the saponifying material used was sodium hydroxide. However, stearic acid, beef fat, tallow, or linoleic or linolenic acids may be used or the saturated or unsaturated glycerides or various fatty acids may be employed with or without the addition of polyethylene glycol. Polyethylene glycol plasticizes these greases to a marked degree but by doing this it lowers the dropping point (melting point) considerably. In lieu of sodium hydroxide the hydroxides or oxides of other alkali or alkaline earth metals may be used. Thus calcium hydroxide, strontium hydroxide, barium hydroxide, lithium hydroxide, or corresponding oxides or suitable carbonates may be employed. These materials may be mixed in various proportions as will be apparent to those skilled in the art.

In lieu of acrylic acid, I may employ other monobasic unsaturated acids of low molecular weight, particularly unsaturated monobasic aliphatic acids having 3 or 4 carbon atoms per molecule, such as methacrylic acid or crotonic acid. Other related compositions may be used with some success although the foregoing are those preferred. Thus where properties desired are not too critical some of the saturated acids of closely related composition, such as glycolic acid, alpha or beta hydroxy butyric acid, and acetoacetic acid may also be used, though less desirable than the unsaturated materials mentioned above.

The quantities of these acids and related materials which may be used may be varied widely depending upon the particular characteristics desired. Preferably the quantity used will be not less than about 0.1% and not more than about 5% by weight, based upon the finished lubricant. These proportions are based on the acid or acidogenic material prior to the neutralization or substantial neutralization which occurs when the saponifying agent is added. The weight proportions of salt, resulting from such neutralization, will be comparable though somewhat higher because of the inclusion of the metal ion. The grease composition otherwise will normally consist essentially of 60 to 95% by weight of a mineral base oil having a viscosity of about 90 to 1000 S. S. U. or more at 100° F. For most purposes the viscosity preferably does not exceed 600 or 700 S. S. U. at 100° F. The soap which is preferably a sodium soap of fatty material but which may be lithium or other alkali metal soaps or an alkaline earth metal soap, or mixtures thereof, will normally be used in proportions of 5 to 35%, based on the weight of the finished lubricant. A soap content between about 8 and 20% is ordinarily preferred.

From the foregoing, it will be understood that the invention in its broader aspects includes a lubricating grease composition of mineral oil base thickened to a grease-like consistency by incorporating in the oil a suitable metal soap of fatty oil or fatty acid. The acid used, preferably acrylic acid, is preferably added to the grease before saponification of the fatty material. As pointed out below, acid forming nitriles may be used instead of the acids. Preferably, also, the soap is an alkali metal soap, especially sodium soap, or lithium soap, having superior high temperature properties. The sodium soap is especially preferred where water solubility is not a serious matter.

Greases of this character have high melting points or dropping points without the usual high soap content which makes them undesirable for lubricating at low or normal temperatures.

From the data in Table II it will be understood that a satisfactory and representative composition may include about 10% of fatty acids, 2 to 2.8% of alkali (preferably sodium hydroxide), 2.0% of acrylic acid (methacrylic acid or crotonic acid may also be used though somewhat inferior) and a small amount, less than 1% of a conventional antioxidant such as phenyl alpha naphthylamine. Obviously the alkali (e. g. sodium hydroxide) serves both to saponify the higher fatty acid and to form a salt with the acrylic or other low molecular acid.

It will be understood that other conventional additives may be used in greases made according to the present invention, such as tackiness agents, viscosity index improvers, anti-corrosion agents, extreme pressure additives, and the like, as will be apparent to those skilled in the art.

In lieu of acrylic acid, acrylonitrile may be added prior to saponification, and this material appears to hydrolyze during the grease cooking to form the acid. It will be understood that reference in the claims to acidogenic materials includes such substances as acrylonitrile which yield the types of acids otherwise specified in the appended claims.

Acrylonitrile or methacrylonitrile is cheaper and more available than either methacrylic or acrylic acid due to the method of manufacture. The greases formed with the nitriles are similar to those employing the acids. However, due to the ease of polymerization of the acrylonitrile and to the fact that the reaction mixture must be held in the kettle longer at elevated temperatures before neutralization in order to permit the evolution of the NH₃ formed by hydrolysis, one of the usual type of inhibitors for the unsaturated nitrile, such as phenyl alpha naphthylamine must be added to the reaction mixture. The formulation and method of manufacture are given below.

Formulation

| | Percent |
|---|---|
| Hydrogenated fish oil acids | 8.0 |
| Oleic acid | 2.0 |
| Acrylonitrile | 2.5 |
| NaOH | 3.2 |
| Phenyl alpha naphthylamine | 0.5 |
| Mineral lubricating oil (500 S. S. U. viscosity @ 100° F. from low cold test crude) | 83.0 |

The acids and one-third of the oil were added to a kettle and heated to 150° F. The acrylonitrile was then added and immediately thereafter the aqueous solution (40%) of sodium hydroxide. Ammonia was evolved immediately. The mixture was stirred while holding temperature below 150° F. When all ammonia ceased coming off, the temperature was raised to 250° F., the balance of the oil was added, and the grease was further heated to 500° F. The molten grease was cooled to 90–110° F. by passing through a grease cooler.

Properties of grease

| | |
|---|---|
| Percent free alkalinity | 0.25 as NaOH |
| Unworked penetration mm./10 | 254 |
| Worked penetration mm./10 | 245 |
| 100,000 stroke penetration (five hole worker) | 315 |
| Dropping point °F | 400 |

Formulation

| | Per cent |
|---|---|
| Hydrogenated fish oil acids | 10.0 |
| Acrylonitrile | 3.0 |
| LiOH-H₂O | 3.1 |
| Phenyl alpha naphthylamine | 0.5 |
| Mineral lubricating oil (58 S. S. U. viscosity at 100° F. from low cold test crude) | 83.4 |

The same method of manufacture was employed as that given above. The grease was of excellent smooth appearance and was extremely stable to shearing stresses.

| | |
|---|---|
| Worked penetration mm./10 | 275 |
| 100,000 stroke penetration mm./10 (five hole worker plate) | 285 |
| Dropping point °F | 465 |
| Per cent free alkalinity as NaOH | 0.43 |

I claim:

1. A lubricating grease composition consisting essentially of a mineral base lubricating oil thickened to a grease consistency with a fatty material which has been saponified with a compound selected from the alkali metal and alkaline earth metal hydroxides, oxides and mixtures thereof, said composition containing the metal salt resulting from the reaction of said metal hydroxide with 0.1 to 5% by weight of an unsaturated aliphatic monobasic acidogenic material having 3 to 4 carbon atoms.

2. A lubricating grease composition consisting essentially of a mineral base lubricating oil thickened to a grease consistency with an alkali metal soap of fatty material, said composition containing the alkali metal salt obtained from 0.1 to 5% by weight of an unsaturated aliphatic monobasic acidogenic material having 3 to 4 carbon atoms per molecule.

3. A lubricating grease composition consisting essentially of 60 to 95% by weight of mineral base lubricating oil, 5 to 35% of alkali metal soap, and alkali metal salt of 0.1 to 5% of an unsaturated aliphatic monobasic acid having 3 to 4 carbon atoms per molecule.

4. A lubricating grease composition consisting essentially of 60 to 95% by weight of a mineral base lubricating oil, 5 to 35% of an alkali metal soap of fatty material and the alkali metal of 0.1 to 5% of acrylic acidogenic material.

5. A lubricating grease composition consisting essentially of 60 to 95% by weight of a mineral base lubricating oil, 5 to 35% sodium soap of fatty material, and the sodium salt of 0.1 to 5% of acrylic acid for the purpose of decreasing the solubility of said sodium soap in water.

6. A lubricating grease composition consisting essentially of 60 to 95% by weight of mineral lubricating oil, 5 to 35% of the sodium soaps of oleic acid and hydrogenated fish oil acids, and the sodium salt of 0.1 to 5.0% of an unsaturated aliphatic monobasic acid having 3 to 4 carbon atoms per molecule.

7. A lubricating grease composition consisting essentially of 77 to 91% by weight of mineral base lubricating oil, 8 to 20% of sodium soap of fatty material, and the sodium salt of 1 to 3% of acrylic acid.

8. A composition as in claim 7 having a slight excess of alkali.

9. A composition as in claim 1 having a slight excess of alkali.

10. A composition as in claim 5 having a slight excess of alkali.

11. A lubricating grease composition consisting essentially of about 85% by weight of mineral oil, together with the reaction products of 10% fatty acids, 2.0 to 2.8% sodium hydroxide, 2.0% acrylic acid, and including a fraction of 1% of an antioxidant.

ARNOLD J. MORWAY.

REFERENCES CITED

The following references are of record in the file of this patent:

UNITED STATES PATENTS

| Number | Name | Date |
| --- | --- | --- |
| 2,197,263 | Carmichael et al. | Apr. 16, 1940 |
| 2,274,673 | Earle | Mar. 3, 1942 |
| 2,289,748 | Beerbower et al. | July 14, 1942 |
| 2,409,333 | Wright et al. | Oct. 15, 1946 |
| 2,417,433 | McLennan | Mar. 18, 1947 |